United States Statutory Invention Registration [19]

[11] Reg. Number: H788

Schneider, Jr. [43] Published: Jun. 5, 1990

[54] METHOD FOR BONDING PLASTIC TO METAL

[75] Inventor: Clayton J. Schneider, Jr., East Aurora, N.Y.

[73] Assignee: The United States of America as represented by the Secretary of the Air Force, Washington, D.C.

[21] Appl. No.: 359,461

[22] Filed: May 31, 1989

[51] Int. Cl.[5] ..... C23F 1/00; B44C 1/22; C03C 15/00; C03C 25/06

[52] U.S. Cl. ..... 156/634; 156/633; 156/654

[58] Field of Search ..... 156/629, 630, 633, 634, 156/654, 656, 659.1, 664, 665, 666, 902

[56] References Cited

U.S. PATENT DOCUMENTS

| | | | |
|---|---|---|---|
| 1,954,403 | 4/1934 | Daly | 156/634 |
| 2,355,949 | 8/1944 | Boutwell | 156/634 |
| 3,455,775 | 7/1969 | Pohl et al. | 156/630 X |
| 4,372,804 | 2/1983 | Hanabusa et al. | 156/634 X |
| 4,684,436 | 8/1987 | Burns et al. | 156/643 |
| 4,690,880 | 9/1987 | Suzuki et al. | 430/313 |
| 4,724,043 | 2/1988 | Bergendahl et al. | 156/643 |
| 4,728,390 | 3/1988 | Yamamoto et al. | 156/634 X |

*Primary Examiner*—John F. Terapane
*Assistant Examiner*—Joseph D. Anthony
*Attorney, Agent, or Firm*—Bobby D. Scearce; Donald J. Singer

[57] ABSTRACT

A method for bonding plastic to a metallic member is described which comprises the steps of forming a preselected pattern of etched cavities in the metallic surface to be bonded, which cavities at least in part increase in width with depth of etching, and subsequently applying a plastic layer to the metallic surface so that a portion of the applied plastic layer fills the cavities and form an interlock with the metallic surface.

10 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR BONDING PLASTIC TO METAL

RIGHTS OF THE GOVERNMENT

The invention described herein may be manufactured and used by or for the Government of the United States for all governmental purposes without the payment of any royalty.

BACKGROUND OF THE INVENTION

The present invention relates generally to methods for bonding dissimilar materials, and more particularly to a method for bonding plastic to metal utilizing a chemical milling process.

In certain fabrication processes wherein a plastic member is placed in contact with a metallic member, injection molding or similar processes have been used to form the plastic member onto the metallic member. If substantial adhesion between the plastic and metallic members is desired, the metallic member may first be conditioned by such processes as roughening or knurling the surface interfacing the plastic member, or flame or plasma spraying a porous coating thereon, or attaching fastening objects thereto. Certain end uses for products formed of a plastic member bonded to a metallic member may, however, require a reproducible and substantially stronger bond at the interface than is obtainable using adhesives and conventional surface preparation techniques.

The present invention substantially solves or reduces in critical importance deficiencies in the prior art as just described by providing a method for bonding plastic to a metallic member. In accordance with teachings of the invention, cavities are formed in the surface of the metallic member by etching using masking and etching techniques and allowing the etchant to undercut the surface to provide an interlock with a plastic member subsequently applied to the metallic surface by spraying, injection molding or the like or by heating/pressing the plastic member to the metallic member.

It is therefore a principal object of the invention to provide a method for bonding plastic to metal.

It is a further object of the invention to provide a method for bonding dissimilar materials, particularly plastic to metal, utilizing masking and etching techniques.

These and other objects of the invention will become apparent as the detailed description of representative embodiments proceeds.

SUMMARY OF THE INVENTION

In accordance with the foregoing principles and objects of the invention, a method for bonding plastic to a metallic member is described which comprises the steps of forming a preselected pattern of etched cavities in the metallic surface to be bonded, which cavities at least in part increase in width with depth of etching, and subsequently applying a plastic layer to the metallic surface so that a portion of the applied plastic layer fills the cavities and forms an interlock with the metallic surface.

DESCRIPTION OF THE DRAWINGS

The invention will be clearly understood from the following detailed description of representative embodiments thereof read in conjunction with the accompanying drawings wherein.

DETAILED DESCRIPTION

Figure 7:
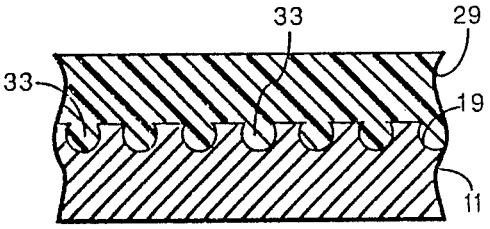
FIG. 7 is a schematic cross section of a representative plastic to metal bond structure made in accordance with the invention.

The method for bonding plastic to a metallic member in accordance with the invention is illustrated in FIGS. 1–6 which show schematic cross sections of intermediate structures obtained utilizing representative etching processes in the practice of the invention and in obtaining the representative plastic to metal bond structure illustrated in schematic cross section in FIG. 7. The process sequences represented by FIGS. 1–7 are examples of methods usable in the practice of the invention and of a representative structure of a bond between plastic and metal obtainable according to the invention. The specific intermediate and final structures shown being, however, only representative, it is understood that variations to the methods described and ultimate bond configurations obtainable may be envisioned by one with skill in the field of the invention within the scope of the appended claims guided by these teachings.

Figure 1:
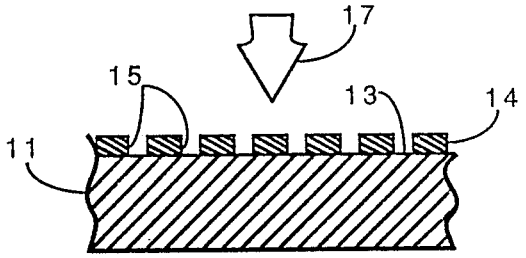
FIGS. 1–6 show schematic cross sections of intermediate structures obtained in the practice of representative processes comprising the invention and in obtaining the representative bond structure illustrated in FIG. 7.
Figure 2:
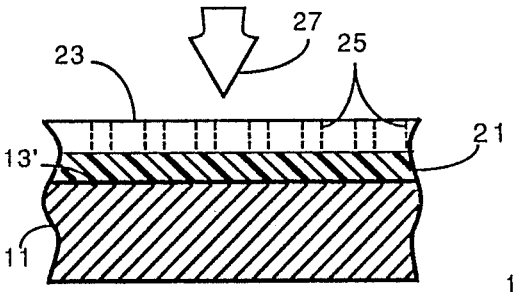
Figure 5:
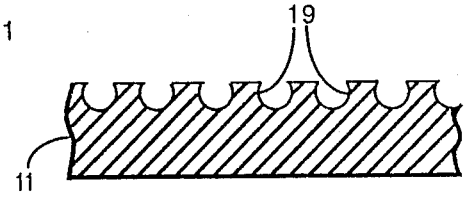

Referring first to FIGS. 1 and 5 together, shown therein are schematic cross sections of intermediate structures obtained utilizing a typical chemical etching or milling process to form the cavities desired to effect the plastic to metal bond according to an embodiment of the invention. As suggested in FIG. 1, a metallic member 11 to which plastic is to be bonded may first be suitably conditioned on a surface 13 thereof by any suitable conventional process in preparation for performing a corresponding chemical milling treatment of surface 13. As will be appreciated by further reading hereof, substantially any metal or alloy may be bonded to plastic utilizing the method of the invention, so long as a surface 13 of metallic member 11 to be bonded may be chemically milled using suitable etchant. Accordingly, as used herein, "metallic member" is intended to include both metals and alloys, including iron, steel, aluminum, magnesium, copper, tin, zinc, titanium, zirconium, uranium, lead, nickel, antimony, beryllium, cadmium, cerium, chromium, cobalt, gold, silver, hafnium, indium, iridium, molybdenum, palladium, platinum, rhenium, rhodium, tantalum, tungsten and vanadium and other alloys thereof as well as a few non-metals, such as glass, for which chemical milling is suitable. Onto surface 13 is overlaid mask 14 or other etch resistant coating defining a pattern 15 of exposed areas corresponding to the desired pattern of etched cavities in surface 13 at which a plastic to metal bond is intended. Any desired pattern may be defined in mask 14 depending on the characteristics of the plastic to metal bond to be made, such as the expanse of the bonded interface, degree of adhesion desired, intended use of the bonded product and the like. The exposed pattern 15 in surface 13 is then etched using a suitable etchant 17 for selected period of time, with or without an applied electrical current, to produce the intermediate structure illustrated in FIG. 5 (mask 14 removed) wherein small pits or cavities 19 in the desired pattern 15 are defined on metallic member 11. Any suitable etchant 17 may be used depending on the material comprising metallic member 11. Typical etchants may therefore include ferric chloride, various acids, bases or electrolytes.

Figure 3:
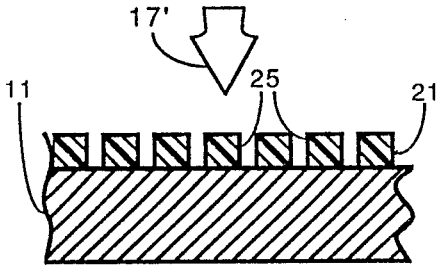
Figure 6:
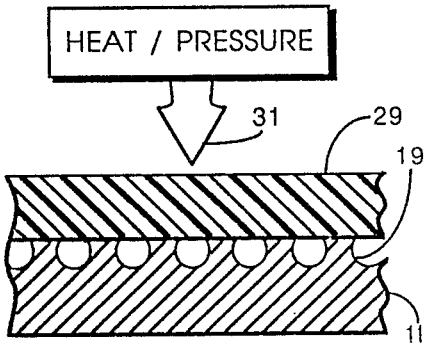
Figure 4:
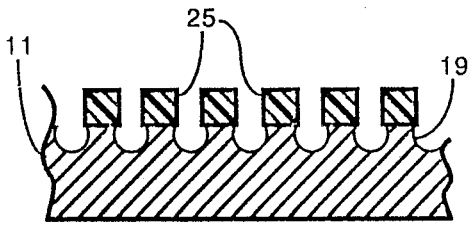

Referring now collectively to FIGS. 2–5, metallic member 11 may in accordance with an alternative etching process contemplated herein first be suitably conditioned on surface 13′ thereof for receiving layer 21 of photoresist material. Layer 21 of photoresist may include any well known brand commercially available for the purpose contemplated herein. Onto layer 21 is overlaid a photographic mask 23 having the desired pattern 25 therein corresponding to the regions in surface 13′ of metallic member 11 at which a plastic to metal bond is intended. Photoresist layer 21 with mask 23 overlaid is then exposed to (usually ultraviolet) radiation 27 to selectively harden a (unmasked) portion of photoresist layer 21 defining the ultimate desired pattern of cavities for effecting the intended bond. Mask 23 is then removed and layer 21 is chemically treated to remove that portion thereof defining the desired pattern of cavities on surface 13′, as suggested by the intermediate structure depicted in FIG. 3 showing layer 21 with the desired pattern 25 therein which corresponds to the ultimate desired pattern of cavities 19 in metallic member 11. The underlying surface 13′ of metallic member 11 is then etched using a suitable etchant 17′ to produce the intermediate structure including cavities 19 illustrated in FIG. 5 in manner corresponding to the process described above in relation FIG. 1.

In addition to any of the etching processes suggested above, any of numerous alternate processes well known to one skilled in the art, including silk screening, stamping, printing, spraying or other methods, may be used to deposit an appropriate pattern of masking material exposing the metallic surface only in areas to be etched.

In accordance with a governing principle of the invention and significant departure from prior art procedures, a chemical etching (or milling) step as just described is performed in manner and degree to intentionally cause undercutting of the unetched portion of surface 13 as suggested in FIG. 5, that is, to provide cavities 19 which at least in part increase in width with depth of etching. In prior art chemical etching or related processes, care is normally taken to avoid the undercutting desired in the practice of this invention. Each cavity 19 may be therefore characterized by the somewhat tear drop shaped cross section suggested in FIG. 5. The purpose of deliberately inducing undercutting according to the invention is to produce a reproducible surface which interlocks with a subsquently applied plastic layer or coating to produce a bond of predictably high bond strength.

Accordingly, once the structure for metallic member 11 as suggested in FIG. 5 is obtained by any of the etching methods mentioned above, a selected plastic or polymer layer 29 is then applied to metallic member 11. Representative materials for plastic or polymer layer 29 attachable according to the invention include polyethylene, nylon, polyether sulfone, ABS, polystyrene, vinyls, acrylics, phenols and other like materials including polyolefins, styrene polymers, styrene copolymers, vinyl polymers or copolymers, polyesters, polyethers, polyamines, polyamides, polyimides, polyurethanes, elastomers, vinylidene polymers, epoxies, phthalate polymers, ionomers, cellulosics, silicones, and other thermoplastics and thermoset plastics. Layer 29 may be applied by any of numerous techniques known in the applicable art such as spraying, sputtering, injection molding, etc, or may be cured in place on metallic member 11, or may be applied as a sheet or bulk plastic material as suggested in FIG. 6 and subjected to heat and/or pressure using appropriate means 31 to obtain the bond suggested in the final structure depicted in FIG. 7. It is noted that the bond between metallic member 11 and plastic layer 29 is substantially mechanical in nature characterized by an interlock between cavities 19 and portions 33 of layer 29 which are formed within cavities 19, in addition to such adhesive or abhesive bond which may otherwise form at the interface of metallic member 11 and plastic layer 29.

In the examples described in relation to FIGS. 1–7 above, the interlock of layer 29 with metallic member 11 is characteristic of the selected pattern of chemically milled pits or cavities, which pattern is not considered limiting of the invention herein. Other interlocking configurations contemplated herein include small spaced holes which increase in diameter with depth, and various patterns of lines, grids, herring bone shapes and the like which may have specific advantages in given applications.

The invention therefore provides an improved method for bonding plastic to a metallic member. It is understood that modifications to the invention as described may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A method for bonding plastic to metal comprising the steps of:
   (a) providing a metallic member for bonding plastic thereto;
   (b) overlaying a mask onto a selected surface of said metallic member, said mask having a preselected pattern therein. defining preselected masked and unmasked protions of said selected surface;
   (c) chemically etching said unmasked portions of said selected surface to preselected depth into said selected surface whereby cavities in said selected surface are formed which at least in part increase in width with depth of etching; and
   (d) applying a layer of plastic to said selected surface of said metallic member whereby a portion of said layer of plastic fills said cavities and forms an interlock with said selected surface.

2. The method of claim 1 wherein the step of applying a layer of plastic is characterized by overlaying a sheet of said plastic onto said selected surface of said metallic member and applying at least one of heat and pressure to cause a portion of said plastic to fill said cavities to form said interlock.

3. The method of claim 1 wherein said metallic member comprises a metal selected from the group consisting of iron, aluminum, magnesium, copper, tin, zinc, titanium, zirconium, uranium, lead nickel, antimony, beryllium, cadmium, cerium, chromium, cobalt, gold, silver, hafnium, indium, iridium, molybdenum, palladium, platinum, rhenium, rhodium, tantalum, tungsten, and vanadium.

4. The method of claim 1 wherein said metallic member comprises an alloy of a metal selected form the group consisting of iron, aluminum, magnesium, copper, tin, zinc, titanium, zirconium, uranium, lead, nickel, antimony, beryllium, cadmium, cerium, chromium, cobalt, gold, silver, hafnium, indium, iridium, molybdenum, palladium, platinum, rhenium, rhodium, tantalum, tungsten, and vanadium.

5. The method of claim 1 wherein said plastic material is selected from the group consisting of polyolefins, styrene polymers, styrene copolymers, vinyl polymers, vinyl copolymers, polyesters, polyethers, polyamines, polyamides, polyimides, polyurethanes, elastomers, vinylidene polymers, phthalate polymers, ionomers, epoxies, cellulosics and silicones.

6. A method for bonding plastic to metal comprising the steps of:

(a) providing a metallic member for bonding plastic thereto;

(b) depositing onto a selected surface of said metallic member a layer of photoresist material;

(c) overlaying onto said layer a photographic mask having a preselected pattern therein defining preselected masked and unmasked portions of said layer;

(d) exposing said unmasked portions of said layer to light to harden said unmasked portions of said layer;

(e) chemically removing said unmasked portions of said layer to expose a portion of said selected surface configured in said preselected pattern;

(f) chemically etching said portion of said selected surface to preselected depth into said selected surface whereby cavities in said selected surface are formed which at least in part increase in width with depth of etching; and (g) applying a layer of plastic to said selected surface of said metallic member whereby a portion of said layer of plastic fills said cavities and forms an interlock with said selected surface.

7. The method of claim 6 wherein the step of applying a layer of plastic is characterized by overlaying a sheet of said plastic onto said selected surface of said metallic member and applying at least one of heat and pressure to cause a portion of said plastic to fill said cavities to form said interlock.

8. The method of claim 6 wherein said metallic member comprises a metal selected from the group consisting of iron, aluminum, magnesium, copper, tin, zinc, titanium, zirconium, uranium, lead, nickel, antimony, beryllium, cadmium, cerium, chromium, cobalt, gold, silver, hafnium, indium, iridium, molybdenum, palladium, platinum, rhenium, rhodium, tantalum, tungsten, and vanadium.

9. The method of claim 6 wherein said metallic member comprises an alloy of a metal selected form the group consisting of iron, aluminum, magnesium, copper, tin, zinc, titanium, zirconium, uranium, lead, nickel, antimony, beryllium, cadmium, cerium, chromium, cobalt, gold, silver, hafnium, indium, iridium, molybdenum, palladium, platinum, rhenium, rhodium, tantalum, tungsten, and vanadium.

10. The method of claim 6 wherein said plastic material is selected from the group consisting of polyolefins, styrene polymers, styrene copolymers, vinyl polymers, vinyl copolymers, polyesters, polyethers, polyamines, polyamides, polyimides, polyurethanes, elastomers, vinylidene polymers, phthalate polymers, ionomers, epoxies, cellulosics and silicones.

* * * * *